(12) United States Patent
Vovan

(10) Patent No.: US 6,206,682 B1
(45) Date of Patent: Mar. 27, 2001

(54) MOLDING ACCELERATED STRIPPER-EJECTOR SYSTEM

(75) Inventor: Terry Vovan, Rialto, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/166,245

(22) Filed: Oct. 5, 1998

(51) Int. Cl.$^7$ .................................................. B29C 45/40
(52) U.S. Cl. ........................ 425/556; 264/334; 425/139; 425/DIG. 5
(58) Field of Search ................. 425/556, DIG. 5, 425/554, 139; 264/334

(56) References Cited

U.S. PATENT DOCUMENTS

| | | | |
|---|---|---|---|
| 2,718,032 | * 9/1955 | Harvey | 249/63 |
| 3,197,825 | * 8/1965 | Hammond | 164/345 |
| 3,726,625 | 4/1973 | Rees | 425/247 |
| 3,807,682 | 4/1974 | Catinella et al. | 249/68 |
| 3,854,856 | 12/1974 | Herbst et al. | 425/173 |
| 3,893,644 | 7/1975 | Drazick | 249/68 |
| 4,050,666 | 9/1977 | Van Tichelt | 249/68 |
| 4,330,256 | 5/1982 | Reichenbach et al. | 425/537 |
| 4,515,543 | 5/1985 | Hamner | 425/112 |
| 4,741,197 | 5/1988 | Spuhler et al. | 72/427 |
| 5,074,779 | * 12/1991 | Tsutsumi et al. | 425/444 |
| 5,385,461 | * 1/1995 | Machida | 425/130 |
| 5,460,508 | * 10/1995 | Ohno et al. | 425/554 |
| 5,472,335 | * 12/1995 | Morikita | 425/556 |
| 5,551,858 | * 9/1996 | Yoshizawa et al. | 425/217 |
| 5,551,864 | 9/1996 | Boskovic | 425/556 |

* cited by examiner

Primary Examiner—Harold Pyon
Assistant Examiner—Emmanuel Luk
(74) Attorney, Agent, or Firm—Roger C. Turner

(57) ABSTRACT

A simple system is provided for lifting ejector pins in sequence, as a knockout piston (30) is raised. First and second ejector pins (40, 42) have lower ends respectively supported on first and second ejectors (70, 72) that each can move vertically, with the second ejector lying below the first one. The second ejector has a vertical through-hole (74), and a force member (80) lies within the hole and can project both above and below the hole. As the knockout piston is moved up, it first engages the bottom of the force member to push it up, so the force member pushes up the first ejector and first ejector pin, while the second ejector and second ejector pin do not move. The top (84) of the knockout piston is wider than the hole, so when the piston reaches the bottom of the second ejector, it then begins to lift the second ejector and second ejector pin. The force member can be a cam pivotally mounted on the second ejector, or can be a shaft that moves vertically.

8 Claims, 4 Drawing Sheets

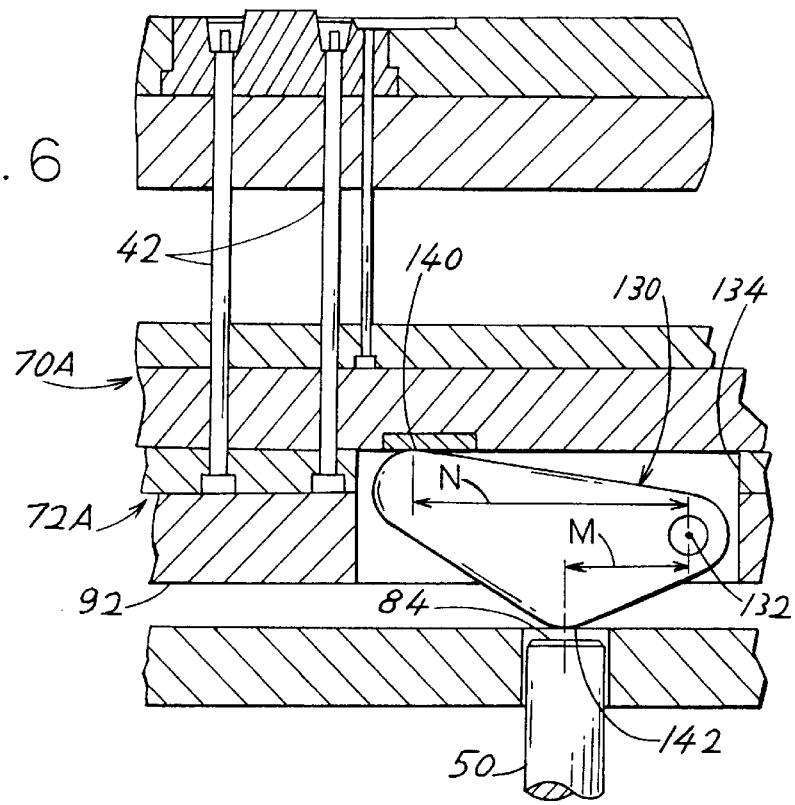
FIG. 6
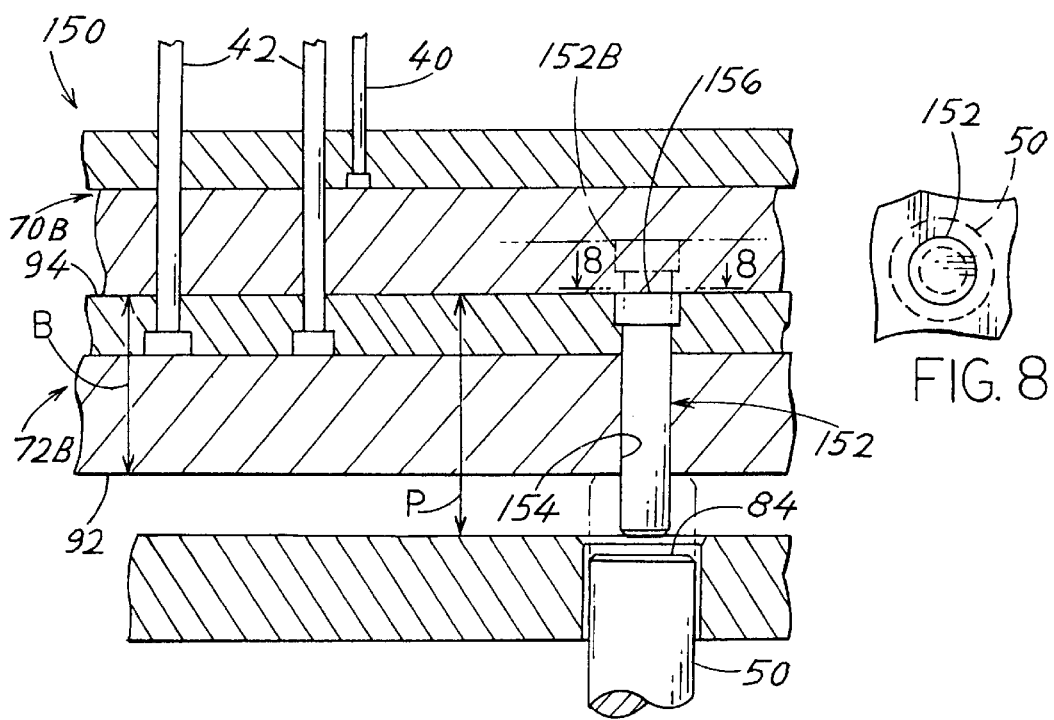
FIG. 7
FIG. 8

MOLDING ACCELERATED STRIPPER-EJECTOR SYSTEM

BACKGROUND OF THE INVENTION

Parts are commonly molded by injecting a heated polymer or die casting metal through a sprue hole, along a gate, and into a cavity formed between a pair of plates. Then, the cover plate is lifted and the gate part is broken away by a first ejector pin. Finally, the molded part is ejected from the mold by one or more second ejector pins. The molding press or other equipment in which the mold lies, commonly has a single knock-out piston that moves up to raise the ejector pins. Thus, a mechanism is required which is moved by the knockout piston, to lift the ejector pins in sequence. The design of such mechanism can be complicated by the fact that the upper ends of the ejector pins may have different horizontal positions for molds used for different parts. Presently, rack and pinion mechanisms are used to move at least one of the ejector pins, but this results in complexity and parts that can be readily damaged. A molding assembly with a mechanism for lifting ejector pins in a predetermined sequence, where the ejector pins can have different horizontal positions, and which was of simple construction, would be of value.

SUMMARY OF THE INVENTION

In accordance with one embodiment of the present invention, a mold assembly is provided for use in a molding machine that includes a knockout piston that can be forcefully moved up, where the assembly is constructed to lift different ejector pins in a predetermined sequence, in a simple, versatile, and rugged construction. First and second ejector pins are mounted respectively on first and second ejectors that can each move vertically, with the second ejector lying below the first one. The second ejector has a hole, and a force member is moveable largely vertically within the hole, the force member having upper and lower ends and being taller than the hole. The lower end of the force member lies directly over the knockout piston while the upper end of the force member lies directly below the first ejector, so when the piston is initially raised, it moves up the force member to move up the first ejector and ejector pin without moving the second ejector. The hole that receives the force member is narrower than the knockout piston, so when the knockout piston reaches the bottom of the second ejector, it then lifts the second ejector to lift the second ejector pin. Since the ejector pins are both mounted on vertically moving ejectors, they can be readily supported at different horizontal positions on the corresponding ejectors.

The force member can be a cam pivotally mounted about a horizontal axis on the second ejector. The cam upper end can be further spaced from the axis than the cam lower end, so the first ejector is moved up more rapidly than the second one. The force member can be a simple shaft that moves vertically.

The novel features of the invention are set forth with particularity in the appended claims. The invention will be best understood from the following description when read in conjunction with the accompanying drawings.

BRIEF DESCRIPTION OF THE DRAWINGS

FIG. 5 is a view taken on line 5—5 of FIG. 2.

FIG. 6 is a partial sectional side view of a mold assembly constructed in accordance with another embodiment of the invention, which uses a cam force member modified from that of FIGS. 1–5.

FIG. 7 is a partial sectional view of a mold assembly constructed in accordance with another embodiment of the invention, where the force member is a vertically slideable shaft.

FIG. 8 is a view taken on line 8—8 of FIG. 7.

DESCRIPTION OF THE PREFERRED EMBODIMENTS

Figure 1:
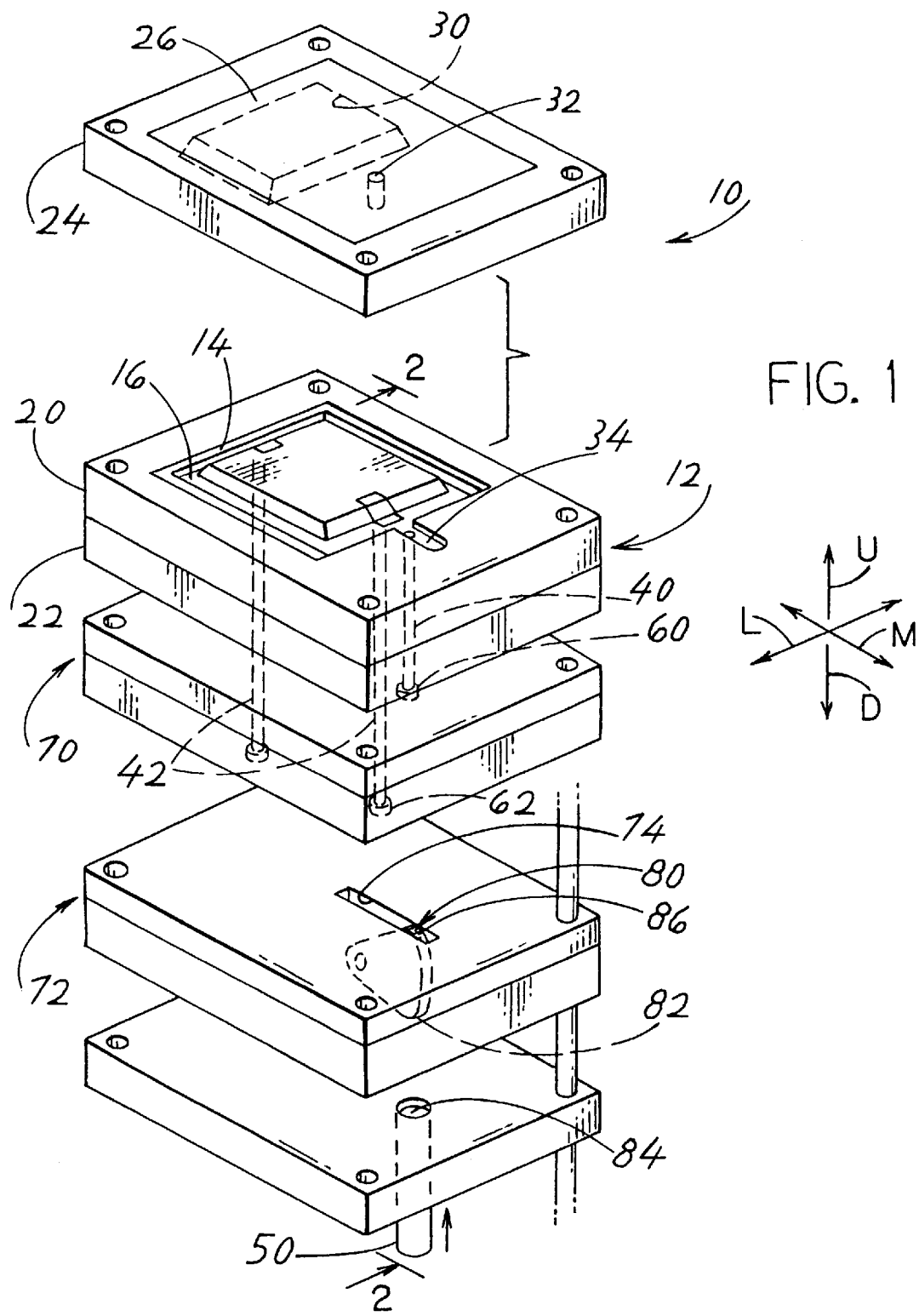
FIG. 1 is an exploded isometric view of a mold assembly constructed in accordance with the present invention, and also showing the knockout piston of a molding machine.

FIG. 1 illustrates a mold assembly 10 which includes a cavity plate 12 that holds a mold insert 14. The mold insert forms part of a cavity 16 that is to form a molded part. It is noted that the cavity plate 12 has upper and lower cavity parts 20, 22. An upper cavity cover plate 24 has a recess 30 that holds another mold insert 26 that forms another cavity portion. To mold a part, the cavity plates 12, 24 are clamped together and molten material is injected through a sprue hole 32. The material moves through a gate 34 into the cavity to fill it. After the material has cooled to a solid state, the cavity cover plate 24 is lifted and the molded part must be ejected. First, a gate ejecting pin 40 is lifted to break off the gate part from the desired molded part. Then second ejector pins 42 are lifted to eject the molded part from the mold cavity.

A press or molding machine in which the cavity plates lie, includes a knockout piston 50 that can be raised to move up the ejector pins 40, 42. A mechanism is required to move the ejector pins in sequence, so the first ejector pin 40 moves up first, and only then does the second ejector pin 42 move up. Applicant mounts lower ends 60, 62 of the first and second ejector pins on first and second ejector plates 70, 72. Each ejector plate or ejector 70, 72 can move vertically independently of the other, to move the lower ends of the corresponding ejector pins. Applicant forms a largely vertical throughhole 74 in the second ejector 72, and places a force member 80 in the hole. The force member 80 has a lower end 82 that can be moved up by the upper end 84 of the knockout piston, the force member having an upper end 86 that can move up the first ejector 70.

Figure 2:
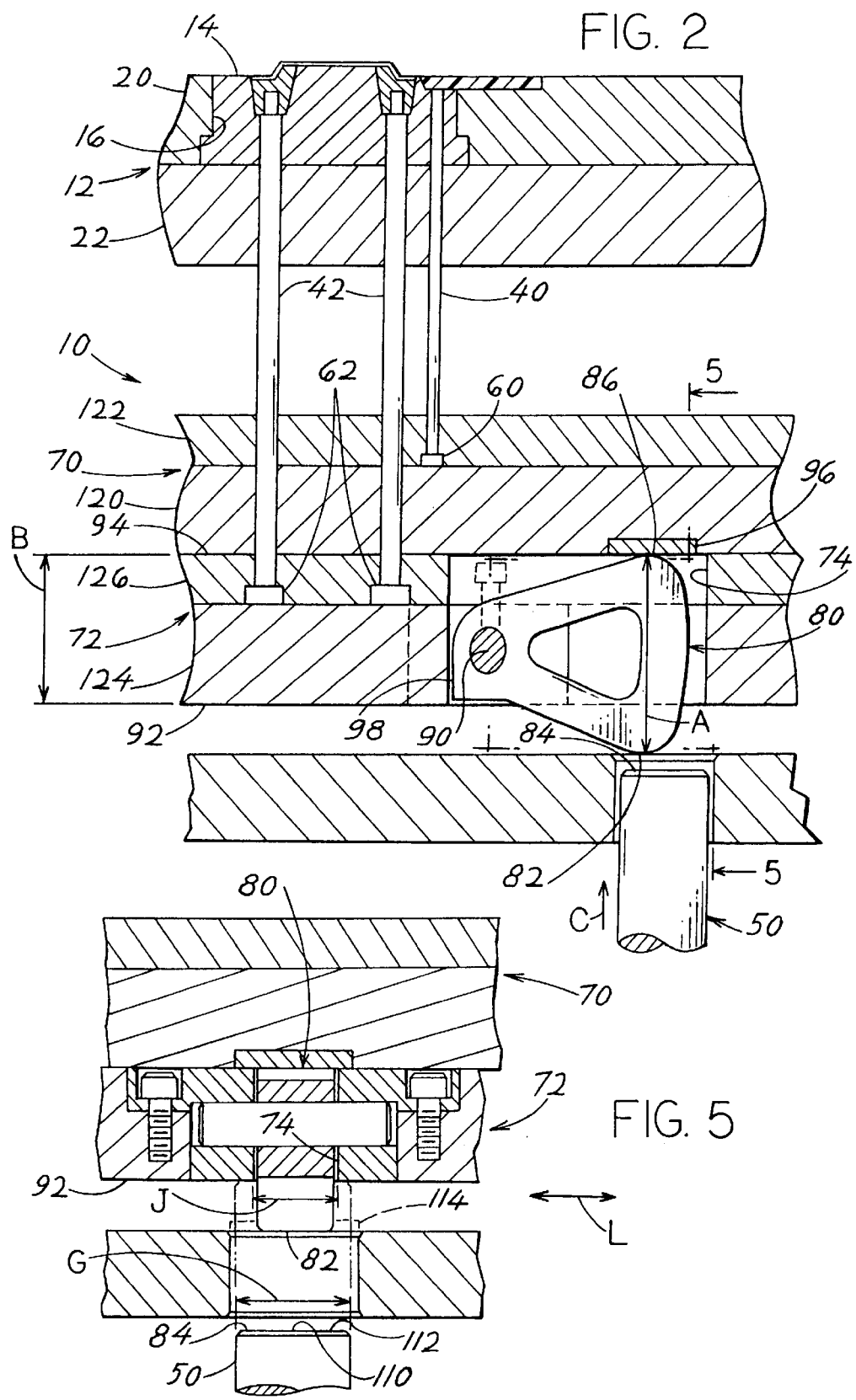
FIG. 2 is a partial sectional view taken on line 2—2 of FIG. 1, before any of the ejector pins are raised.

FIG. 2 shows that the force member 80 is a cam that is pivotally mounted about a horizontal axis 90 on the second ejector 72. The vertical height A of the cam between its upper and lower ends, is greater than the vertical height B of the second ejector 72. The cam initially lies in the position shown in FIG. 2, with its lower end 82 projecting downwardly below the lower end 92 of the second ejector, and with its upper end 86 about flush with the upper end 94 of the second ejector. A stop 98 on the cam maintains this initial position. When the knockout piston 50 is moved up, as indicated by arrow C, the upper end 84 of the knockout piston pushes up against the lower end 82 of the cam to raise it. The cam pivots and its upper end pushes against a wear pad 96 of the first ejector to lift the first ejector 70, without lifting the second ejector 72.

Figures 3, 4:
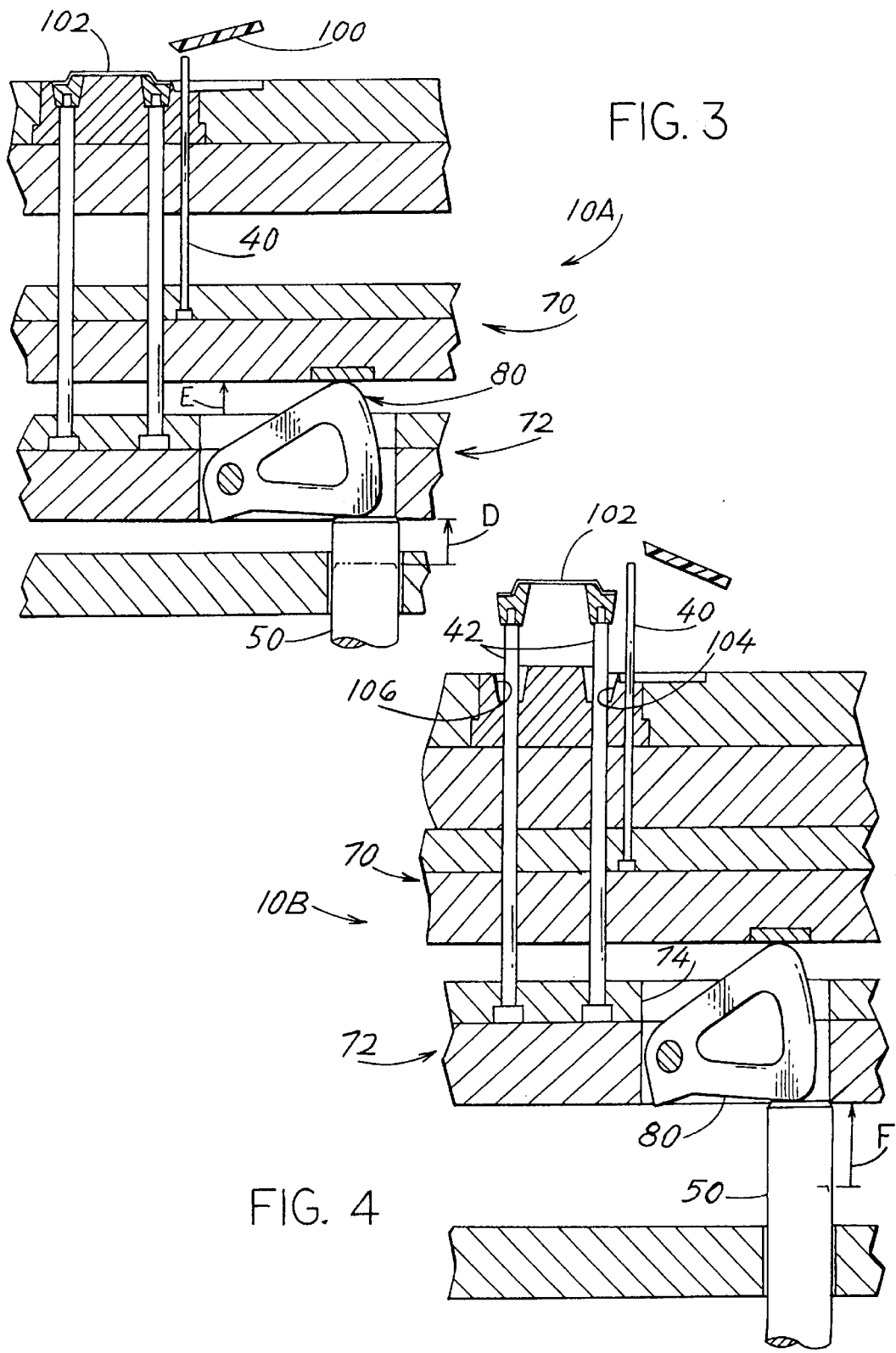
FIG. 3 is a view similar to that of FIG. 2, but with only the first ejector pin raised.
FIG. 4 is a view similar to that of FIG. 3, but with the second ejector pins also raised.

FIG. 3 shows the mold assembly at 10A after the knockout piston 50 has pivoted the cam force member 80 and lifted its upper and lower ends. The piston has moved up by the distance D, and has moved up the first ejector 70 by the distance E, all without moving the second ejector 72. As the first ejector 70 is lifted, it moves up the first ejector pin 40. The first ejector pin breaks off the gate part 100 that was formed during the molding process, to separate it from the molded part 102. The knockout piston 50 continues to move up, until it reaches the position shown in FIG. 4. In FIG. 4, the knockout piston has moved upward an additional distance F, and in so doing has raised the second ejector 72 by the distance F. Such upward movement of the second ejector 72 raises the second ejector pins 42, to lift the molded part 102 out of the mold cavity, so the molded part can be readily removed. It can be seen that the ejector pins move through apertures 104, 106 in the mold plate.

FIG. 5 shows that the lateral (direction L) width G of the top 84 of the knockout piston 50 is greater than the width J of the bottom of the hole 74 in the second ejector 72. Initially a middle portion 110 of the piston top pushes up against the cam force member 80 until the lower end 82 of the force member is flush with the bottom of the hole 74. Further upward movement of the piston results in opposite side portions 112 of the piston top, which lie on opposite sides of the middle portion 110, pushing up against the lower surface or end 92 of the second ejector, to lift the second ejector. It would be possible to provide the cam with sideward projections as at 114 so the knockout piston pushes the projections 114 up against the second ejector.

The provision of a force member that can move largely vertically through a narrow hole in the second ejector, provides a simple and rugged mechanism for initially transferring force from the knockout piston to the first ejector to initially lift the first ejector pin. The fact that the upper portion of the piston is wider than the hole, results in the piston lifting the second ejector after the first ejector has been lifted a predetermined distance, to lift the second ejector pins after the first ones have been lifted.

As shown in FIG. 2, the lower end 60 of the first ejector pin 40 lies on the top of a lower plate 120 of the first ejector, and is trapped by an upper plate 122 of the first ejector. Similarly, the lower ends 62 of the second ejector pins are trapped between lower and upper plates 124, 126 of the second ejector. When molding different parts, the lateral and longitudinal horizontal positions of the ejector pins may have to be changed. This can be accomplished by boring and drilling different holes in the plates of the two ejectors. The force member 80 and the hole in which it moves, do not have to be changed so long as the knockout piston lies in the same position.

FIG. 6 shows a force member 130 in the form of a cam that is pivotally mounted about an axis 132 in a hole 134 of the second ejector 72A. The upper end 140 of the cam lies a distance N from the axis which is greater than the distance M of the lower end 142, the difference in distance being at least 20% of the smaller distance M. As a result, when the knockout piston 50 is raised to pivot the force member about the axis 132, the upper end 140 of the force member moves up much faster than the upward speed of the piston 50. This results in the first ejector 70A and the first ejector pin 40 moving up rapidly. Such rapid upward movement can be useful in obtaining a clean break of the gate part from the molded part. When the piston 50 moves up until its upper end 84 reaches the lower surface 92 of the second ejector, the piston then lifts the entire second ejector 72B and the second ejector pins 42. Of course, during such movement, the first ejector pin 40 is further lifted.

FIG. 7 illustrates another mold assembly 150 that includes first and second ejectors 70B, 72B, that each supports a corresponding first pin 40 and second pins 42. However, the force transmitting or force member 152 is in the form of a shaft that is slideable vertically within a vertical hole 154 in the second ejector. The force member 152 has a greater vertical height P than the height B of the second ejector. Initially, the ejectors 70B, 72B lie in the positions illustrated, where the first ejector 70B may lie directly on the second one, and with the upper end 156 of the force member lying flush with or slightly below the upper surface 94 of the second ejector. When the knockout piston 50 is raised, it initially raises the force member 152 so the force member moves to the position 152B to raise the first ejector. In the position of FIG. 7, the upper end 84 of the piston has reached the lower surface 92 of the second ejector, and thereafter upward movement of the piston raises the second ejector and the second ejector pins 42.

Thus, the invention provides a mold assembly for use in a molding machine, which enables upward movement of a knockout piston of the molding machine, to begin the upward movement of first and second ejector pins in a controlled manner. That is, the first ejector pin is lifted first, and after it rises a predetermined distance, the second ejector pin or pins begin to move up. This is accomplished by positioning a force transmitting member or force member within a largely vertical hole in the second ejector, with the height of the force member being greater than the height or thickness of the second ejector. Initially, the lower end of the force member lies below the bottom of the hole in the second ejector, and directly over the piston, so the piston initially moves up the force member to initially move up only the first ejector. When the top of the piston reaches the bottom of the second ejector, or at least the walls surrounding the hole in the second ejector, the piston then begins to move up the second ejector and the second ejector pins. Although the movement is generally vertical, it is possible to move the different parts in directions angled from the vertical. The force member can be a pivoting cam, and also can be a shaft that moves vertically.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A mold assembly for use in a molding machine that includes a knockout piston that can move up, comprising:

a cavity plate forming a mold cavity with a pair of ejector pin-receiving apertures;

first and second ejectors that are independently vertically moveable, with said injectors both lying under said cavity plate, with said second ejector lying under said first ejector, and with said second ejector having a primarily vertical through hole;

first and second ejector pins having lower ends supported respectively on said first and second ejectors and having upper ends lying in said apertures of said cavity plate;

a force member moveably mounted in said hole, said force member having a lower end lying directly over a first portion of said knockout piston so said force member is moved up when said knockout piston moves up, and said force member having an upper end lying directly under said first ejector to move up said first ejector and said first ejector pin;

said force member having a vertical height between said upper and lower ends which is greater than the vertical height of said hole in said second ejector, so said force member lower end can lie below the bottom of said hole and can be moved up by said knockout piston while said force member upper end moves up said first ejector, without moving up said second ejector;

said second ejector having a portion positioned in line with said knockout piston to be pushed up by said knockout piston after said force member has been moved up a predetermined distance.

2. The mold assembly described in claim 1 wherein:

said hole in said second ejector has a lower end that has a predetermined hole width (J), and said knockout piston has an upper end of a greater width (G) than said hole width, so said knockout piston presses against a surface of said second ejector after said force member has been moved up.

3. The mold assembly described in claim 1 wherein:

said force member is in the form of a shaft that is vertically slideable in said hole.

4. A mold assembly that includes a cavity plate having a cavity for forming areas of a molded part, first and second ejectors that are vertically moveable independent of each other, with said first ejector lying generally above said second ejector, a first ejector pin supported on said first ejector, a second ejector pin supported on said second ejector, a knockout piston which moves up to move up the ejectors and pins, and a mechanism for coupling said knockout piston to said ejectors, comprising:

a force member, said second ejector having walls forming a generally vertical throughhole and said force member being moveable generally vertically in said hole, said force member having a lower end positioned over said knockout piston and said force member having an upper end lying under said first ejector to move thereagainst, so when said knockout piston is moved up it moves said force member generally upward against said first ejector to move up said first ejector and said first ejector pin;

said force member and said throughhole, each have a lower portion that is narrower than said knockout piston, so after said knockout piston has moved up said force member to raise said first ejector pin, said knockout piston pushes against said second ejector at a location around said hole to raise said second ejector and said second ejector pin.

5. A method for operating a mold assembly to first raise a first ejector and a first ejector pin mounted thereon, and to then raise a lower second ejector and a second ejector pin mounted thereon, by the use of a knockout piston that moves upward, comprising:

forming a hole in said second ejector;

mounting a force member in said hole with an upper force member portion that can project up above said hole and a lower force member portion that can project below said hole when said upper portion projects above said hole;

moving up said knockout piston against said force member lower portion and continuing to move up said knockout piston to move up said force member to push up said first ejector and to lift said first ejector pin, and so as said knockout piston continues to move up it then moves up said second ejector to lift said second pin.

6. The method described in claim 5 wherein:

said step of forming said hole includes forming said hole so the hole lower end is of smaller width than the width of an upper end of said knockout piston, and said step of continuing to move up said knockout piston includes moving the upper end of said knockout piston against a lower surface of said second ejector that lies beside the bottom of said hole.

7. A mold assembly for use in a molding machine that includes a knockout piston that can move up, comprising:

a cavity plate forming a mold cavity with a pair of ejector pin-receiving apertures;

first and second ejectors that are independently vertically moveable, with said injectors both lying under said cavity plate, with said second ejector lying under said first ejector, and with said second ejector having a primarily vertical through hole;

first and second ejector pins having lower ends supported respectively on said first and second ejectors and having upper ends lying in said apertures of said cavity plate;

a force member moveably mounted in said hole, said force member having a lower end lying directly over a first portion of said knockout piston so said force member is moved up when said knockout piston moves up, and said force member having an upper end lying directly under said first ejector to move up said first ejector and said first ejector pin;

said force member having a vertical height between said upper and lower ends which is greater than the vertical height of said hole in said second ejector, so said force member lower end can lie below the bottom of said hole and can be moved up by said knockout piston while said force member upper end moves up said first ejector, without moving up said second ejector;

said second ejector having a portion positioned in line with said knockout piston to be pushed up by said knockout piston after said force member has been moved up a predetermined distance;

said force member comprises a cam that is pivotally mounted about a horizontal axis on said second ejector, with said cam having a lower part spaced from said axis and lying over said knockout piston, and with said cam having an upper part spaced from such axis and lying under said first ejector to push up against said first ejector.

8. The mold assembly described in claim 7 wherein:

said cam upper part lies further (N) from said axis than said cam lower part (M), to thereby rapidly raise said primary ejector.

\* \* \* \* \*